(12) United States Patent
Vo et al.

(10) Patent No.: US 10,044,424 B2
(45) Date of Patent: *Aug. 7, 2018

(54) METHOD FOR OPERATING A MOBILE TRANSCEIVER

(71) Applicant: BlackBerry Limited, Waterloo (CA)

(72) Inventors: Phillip Vo, Boynton Beach, FL (US); George Albert Doskow, Boynton Beach, FL (US); Jose Eduardo Korneluk, Lake Worth, FL (US); Sergio Javier Berriz, Miami, FL (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,564

(22) Filed: Aug. 9, 2017

(65) Prior Publication Data

US 2017/0338872 A1 Nov. 23, 2017

Related U.S. Application Data

(63) Continuation of application No. 14/987,292, filed on Jan. 4, 2016, now Pat. No. 9,742,479.

(51) Int. Cl.
| | | |
|---|---|---|
| H04W 24/00 | (2009.01) | |
| H04B 7/06 | (2006.01) | |
| H04W 4/02 | (2018.01) | |
| H04B 7/185 | (2006.01) | |
| G06Q 10/08 | (2012.01) | |
| H04W 24/04 | (2009.01) | |
| H04W 24/08 | (2009.01) | |

(52) U.S. Cl.
CPC ....... *H04B 7/0608* (2013.01); *G06Q 10/0833* (2013.01); *H04B 7/18513* (2013.01); *H04B 7/18517* (2013.01); *H04W 4/02* (2013.01); *H04W 24/04* (2013.01); *H04W 24/08* (2013.01)

(58) Field of Classification Search
CPC .......... H04W 4/02; H04W 4/12; H04W 4/14; H04W 64/00
USPC .......................................... 455/456.1, 456.2
See application file for complete search history.

(56) References Cited

U.S. PATENT DOCUMENTS

| | | | | |
|---|---|---|---|---|
| 2007/0194945 A1* | 8/2007 | Atkinson | ............... | G08C 17/02 340/13.26 |
| 2012/0028680 A1* | 2/2012 | Breed | ..................... | B60C 11/24 455/556.1 |

FOREIGN PATENT DOCUMENTS

| | | |
|---|---|---|
| CA | 2807843 A1 | 9/2013 |
| JP | 2008061080 A | 3/2008 |
| KR | 20120027738 A | 3/2012 |
| KR | 101589214 B1 | 1/2016 |

(Continued)

OTHER PUBLICATIONS

International Search Report and Written Opinion; PCT/CA2016/051528; dated Mar. 16, 2017.

*Primary Examiner* — Temica M Beamer
(74) *Attorney, Agent, or Firm* — Ridout and Maybee LLP

(57) ABSTRACT

A method and mobile transceiver for asset tracking. In one aspect, there is a of operating the mobile transceiver comprising determining whether a door of a container to which the mobile transceiver is mounted is open or closed, switching an active antenna for the wireless transceiver to the first antenna when the door of the container is determined to be open, and switching the active antenna for the wireless transceiver to the second antenna when the door of the container is determined to be closed.

20 Claims, 10 Drawing Sheets

(56) References Cited

FOREIGN PATENT DOCUMENTS

WO     WO 2015078848 A1    6/2015

\* cited by examiner

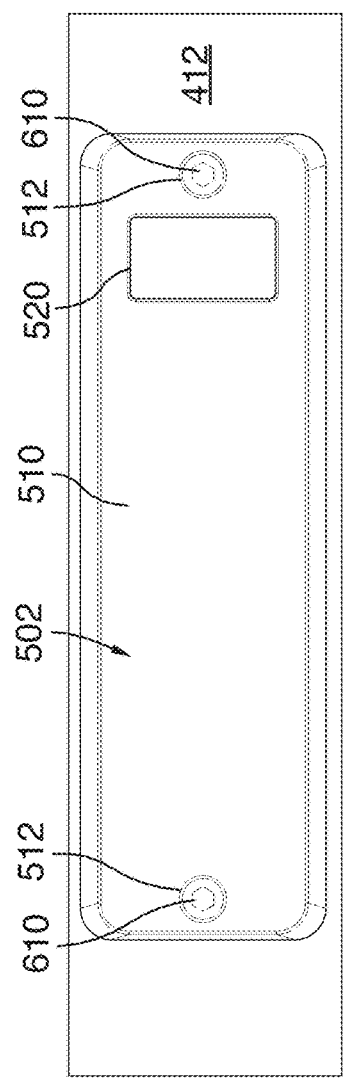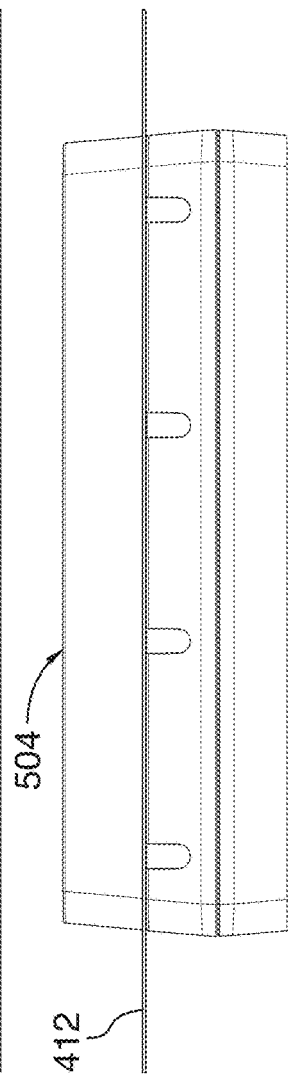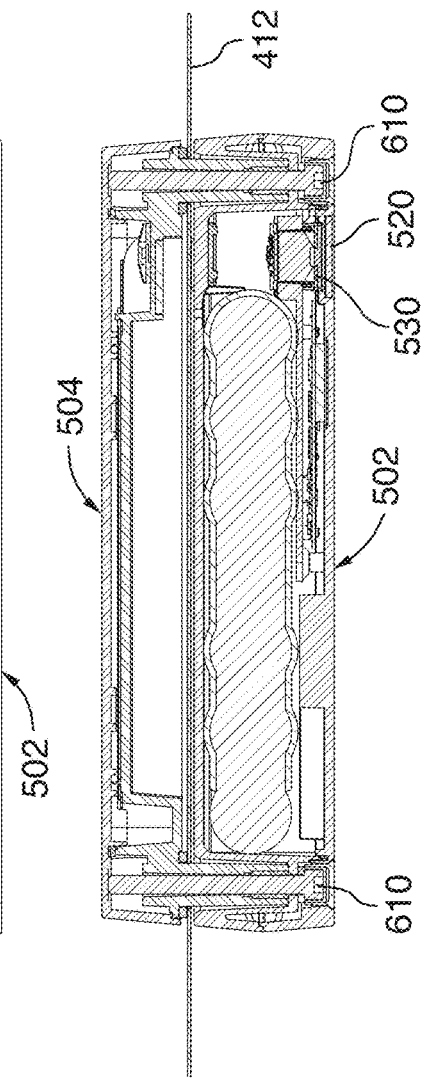

METHOD FOR OPERATING A MOBILE TRANSCEIVER

RELATED APPLICATION DATA

The present application is a continuation of U.S. patent application Ser. No. 14/987,292, filed Jan. 4, 2016, the content of which is incorporated herein by reference.

TECHNICAL FIELD

The present disclosure relates generally to mobile transceivers, and more specifically, to a method for operating a mobile transceiver.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. Examples of types of GNSS tracking devices include: a data logger, a data pusher and a data puller. A data logger may store the measured location data in internal memory for subsequent download and analysis. A data pusher (also known as a beacon) may send location data stored in internal memory to a server or other device in accordance with predefined parameters. A data puller (also known as a transponder) may store location data in internal memory and provides the location data in response to queries from a server or other device. GNSS tracking devices may have limited power and/or limited processing resources. Accordingly, methods of efficiently operating and deploying GNSS tracking devices may be desirable.

BRIEF DESCRIPTION OF THE DRAWINGS

FIG. 6A is a front view of the mobile transceiver housing of FIG. 5 mounted to a door of the shipping container of FIG. 4 viewed from the interior of the shipping container.

FIG. 6B is a side view of the mobile transceiver housing of FIG. 5 mounted to a door of the shipping container of FIG. 4.

FIG. 6C is a sectional view of the mobile transceiver housing of FIG. 5 mounted to a door of the shipping container of FIG. 4.

DESCRIPTION OF EXAMPLE EMBODIMENTS

Figure 1:
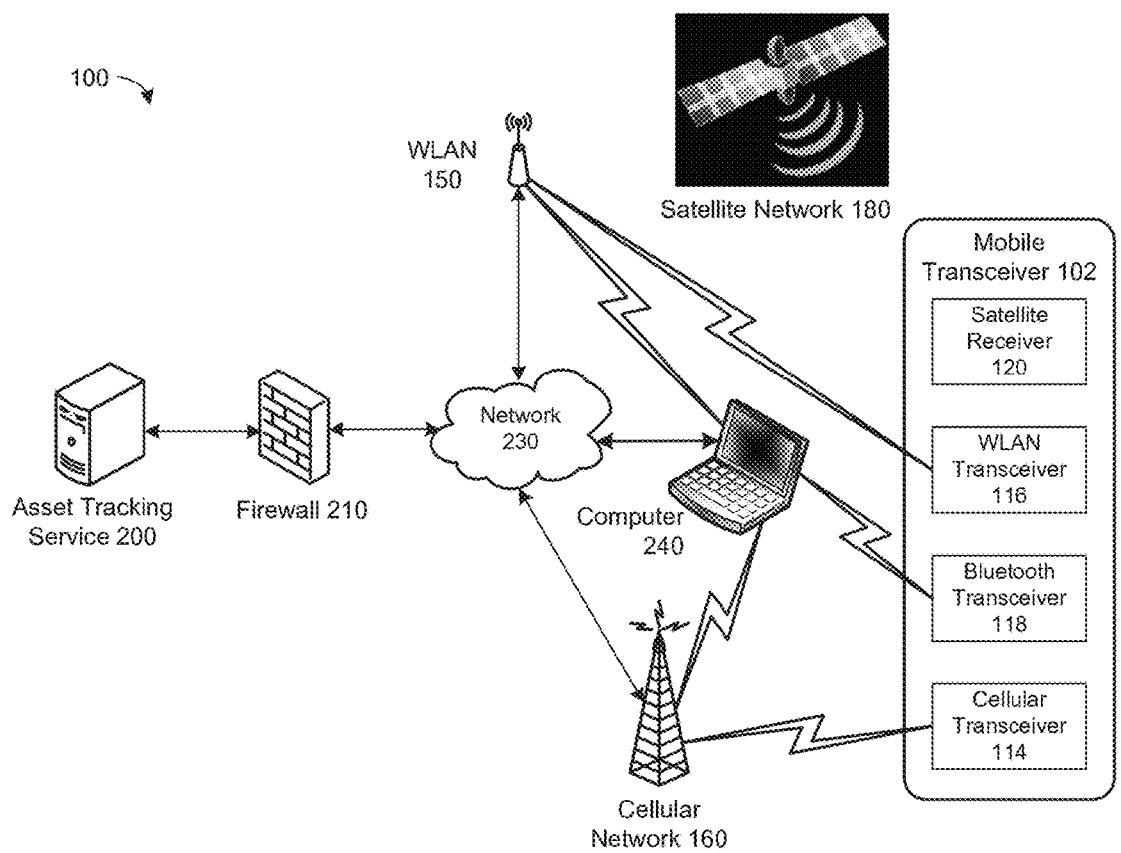
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that may allow global and long-range tracking applications in which an asset in global and long-range transit can be tracked even though it crosses wireless carrier and network coverage boundaries while in transit. In global and long-range tracking applications the mobile transceiver and the asset being tracked may cross wireless carrier and network coverage boundaries while in transit. For example, it is not uncommon for a shipping container to originate in mainland China and travel around South Africa with a final destination in North America. The mobile transceiver may be mounted to the exterior of a shipping container during transit. During transit, it is possible that the antenna of the mobile transceiver becomes damaged, malfunctions, disconnected or is tampered with in a manner that inhibits or prevents the accurate reporting of location information and possibly other information such as sensor data.

The present disclosure provides a method and mobile transceiver for asset tracking which detects an abnormal antenna condition (e.g., detected damage or tampering or suspected damage or tampering). The mobile transceiver of the present disclosure comprises a cellular transceiver and a satellite receiver, each having an internal antenna and external antenna. The mobile transceiver detects an abnormal antenna condition, and can switch from the external antenna to internal antenna or vice versa when an abnormal antenna condition is detected.

In accordance with an example embodiment of one aspect of the present disclosure, there is provided a method of operating a mobile transceiver having a processor, a wireless transceiver, an internal antenna and an external antenna each coupled to the wireless transceiver via a switch, the method comprising: switching an active antenna for the wireless transceiver to the external antenna; determining whether an indication of an abnormal antenna condition of the external antenna has been detected; and when an indication of an abnormal antenna condition of the external antenna has been detected, switching the active antenna for the wireless transceiver from the external antenna to the internal antenna, and sending, by the wireless transceiver via the internal antenna, a notification to an asset tracking service that an indication of an abnormal antenna condition of the external antenna has detected.

In accordance with another example embodiment of one aspect of the present disclosure, there is provided a method of operating a mobile transceiver having a processor, a wireless transceiver, an internal antenna and an external antenna each coupled to the wireless transceiver via a switch, wherein the mobile transceiver is a two-part, interconnected module, configured to be mounted to a door of a shipping container, wherein the interconnected module comprises an internal module to be located on an interior of the door of the shipping container and which carries the internal antenna, and an external module to be located on an exterior of the door of the shipping container and which carries the external antenna, the method comprising: waking up the mobile transceiver after a period of inactivity; determining whether the door of the shipping container to which the mobile transceiver is mounted is open or closed; switching to the external antenna as an active antenna when the door of the shipping container to which the mobile transceiver is mounted is determined to be closed; and switching to the internal antenna as the active antenna when the door of the shipping container to which the mobile transceiver is mounted is determined to be open.

In accordance with a further example embodiment of one aspect of the present disclosure, there is provided a method of operating a mobile transceiver having a processor, a wireless transceiver, a plurality of antennas coupled to the wireless transceiver via a switch, the method comprising: waking up the mobile transceiver after a period of inactivity; measuring, via the wireless transceiver, a wireless signal using each of the plurality of antennas; selecting an antenna in the plurality of antennas in accordance with the measured wireless signals; and switching to the selected antenna as an active antenna of the wireless transceiver.

In accordance with an example embodiment of another aspect of the present disclosure, there is provided a mobile transceiver, comprising: a processor; a memory coupled to the processor; a wireless transceiver coupled to the processor; an internal antenna and an external antenna each coupled to the wireless transceiver via a switch; wherein the mobile transceiver is configured to perform the methods described above and herein.

In accordance with an example embodiment of a further aspect of the present disclosure, there is provided a non-transitory machine readable medium having tangibly stored thereon executable instructions that, when executed by a processor of a mobile transceiver, the mobile transceiver comprising a memory, a wireless transceiver, an internal antenna and an external antenna each coupled to the wireless transceiver via a switch, cause the mobile transceiver to perform the methods described above and herein.

In accordance with an example embodiment of a further aspect of the present disclosure, there is provided a method of operating a mobile transceiver having a processor, a wireless transceiver, a first antenna and a second antenna each coupled to the wireless transceiver via a switch, the method comprising: determining whether a door of a container to which the mobile transceiver is mounted is open or closed; switching an active antenna for the wireless transceiver to the first antenna when the door of the container is determined to be open; and switching the active antenna for the wireless transceiver to the second antenna when the door of the container is determined to be closed.

In accordance with an example embodiment of a further aspect of the present disclosure, there is provided a mobile transceiver, comprising: a processor; a memory coupled to the processor, wherein the memory has stored thereon executable instruction; a wireless transceiver coupled to the processor; a first antenna and a second antenna each coupled to the wireless transceiver via a switch; wherein the executable instructions, when executed by the processor, cause the mobile transceiver to perform the methods described above and herein.

In accordance with an example embodiment of a further aspect of the present disclosure, there is provided a non-transitory machine readable medium having tangibly stored thereon executable instructions that, when executed by a processor of a mobile transceiver, the mobile transceiver comprising a memory, a wireless transceiver, a first antenna and a second antenna each coupled to the wireless transceiver via a switch, cause the mobile transceiver to perform the methods described above and herein.

Figure 2:
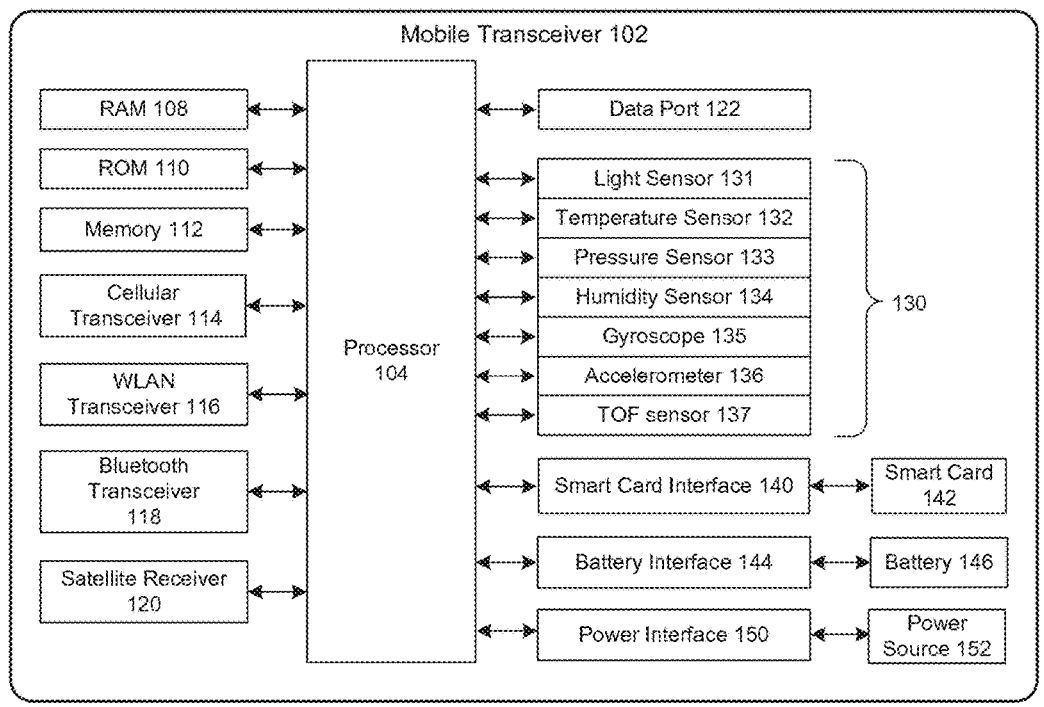
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), and a plurality of environmental sensors 130 for sensing the environment of the mobile transceiver 102. The sensors 130 may comprise a light sensor 131, temperature sensor 132, pressure sensor 133, humidity sensor 134, gyroscope 135, accelerometer 136, one or more time-of-flight (ToF) sensors 137 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 can use signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed. In the described embodiment, the cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. In other embodiments, multiple dedicated transceivers may be provided to support different wireless services, such as 4G LTE, 3G and 2G wireless services.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computer 240. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. In the described embodiment, the mobile transceiver 102 includes a smart card interface 140 for receiving a smart card 142 for storing and reading data by the processor 104. The smart card 142 may be a Subscriber Identity Module (SIM) card for use in a GSM network or other type of smart card for use in the relevant wireless network type which provides wireless network access. In at least some embodiments, the smart card 142 is a Universal Integrated Circuit Card (UICC) containing at least a SIM and a USIM application. UICC is the smart card used in most contemporary GSM and UMTS networks. While a SIM card for a GSM network has been described as an example, the term smart card is intended to encompass all types of smart cards and other similar technology for providing a Universal Subscriber Identity Module (USIM), Removable User Identity Module (R-UIM) or CDMA Subscriber Identity Module (CSIM) or other similar technology used in UMTS and CDMA networks.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service.

The mobile transceiver 102 may also include a power interface, such as a power port, for connecting to an external power source 152 such as an alternating current (AC) power adapter. The mobile transceiver 102 can use the external power source 152 rather than the battery 146. If the battery 146 is rechargeable, the external power source 152 may be used to recharge the battery 146.

Referring again to FIG. 1, an example communication system 100 in which a mobile transceiver 102 of the present disclosure can operate will be described. The mobile transceiver 102 typically uses the cellular network 160 to access an asset tracking service (e.g., a server or fleet management system) 200. The asset tracking service 200 may be implemented as one or more server modules and is typically located behind a firewall 210. The asset tracking service 200 provides administrative control and management capabilities over a plurality of managed mobile transceivers 102. The asset tracking service 200 may be embodied as a variety of configurations, in hardware or software, including a server-based system, an Application Programming Interface (API) and/or endpoint that provides access and abstraction of the functionality of asset tracking service 200 such that no hardware or configuration information is necessary to access the functionality other than the API location and functional definitions.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location at regular intervals, in accordance with a predefined schedule, or in response to a trigger event, among other possibilities. The frequency or schedule at which the location is determined may be fixed or configurable. The mobile transceiver 102 stores the determined location, typically in terms of Latitude and Longitude, and a time at which the location was determined in a data log stored in the memory 112 of the mobile transceiver 102. Thus, the data log provides an asset tracking log.

The mobile transceiver 102 may also use one or more of the sensors 130 to sense or measure an environment of the mobile transceiver 102. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log), which is stored in the memory 112. As with the location data, the mobile transceiver 102 may collect sensor data at regular intervals, in accordance with a predefined schedule, or in response to a trigger event, among other possibilities. The frequency or schedule at which sensor data is obtained may be fixed or configurable.

The mobile transceiver 102 attempts to connect to the asset tracking service 200 to report location and/or sensor data stored in the asset tracking log at regular intervals, in accordance with a predefined schedule, or in response to a trigger event, among other possibilities. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and need not coincide, although the cycles typically overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 3A:
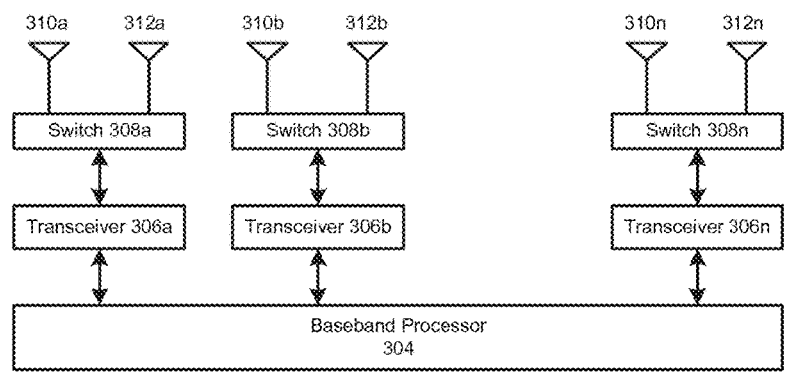
FIG. 3A is a block diagram illustrating a wireless communication subsystem in accordance with an example embodiment of the present disclosure.

Referring now to FIG. 3, a wireless communication subsystem 300 in accordance with an example embodiment of the present disclosure will be described. The wireless communication subsystem 300 includes a digital baseband processor 304 which manages functions that require an antenna, and a plurality of wireless transceivers and/or receivers 306, represented individually by references 306a, 306b, . . . 306n. Each of the wireless transceivers/receivers 306 is coupled to a switch 308, represented individually by references 308a, 308b, . . . 308n, which is coupled to an internal antenna 310, represented individually by references 310a, 310b, . . . 310n, and an external antenna 312, represented individually by references 312a, 312b, . . . 312n. The external antennas 312 typically serve as the primary antennas because of the reduced RF interference associated with being located outside of the shipping container 400, whereas the internal antennas 310 typically serve as secondary antennas because of the increased RF interference associated with being located inside of the shipping container 400.

In at least some embodiments, the external antennas 312 are provided in a common external antenna module, and a ground pin of the external antenna module is connected to a general-purpose input/output (GPIO) pin of the processor 104 which can be monitored, for example, when the mobile transceiver 102 wakes up. When the ground pin of the external antenna module is not detected, this is an indication that the external antenna module is disconnected, an electronic malfunction has occurred in the external antenna module, or the external antenna 312 and/or the external housing module 504 has been otherwise damaged or tampered with. In other embodiments, a ground pin of each external antenna 312 may be individually connected to a GPIO pin of the processor 104.

As noted above, the wireless transceivers/receivers 306 include at least one cellular transceiver 114 such as a multi-band cellular transceiver that supports multiple radio frequency bands which may include, for example, multiple 4G Long-Term Evolution (LTE) or LTE Advanced bands as well as global 3G and 2G bands and at least one satellite receiver 120.

While a common baseband processor 304 for the cellular transceiver 114 and satellite receiver 120 has been described, in other embodiments a separate baseband processor could be provided for the satellite receiver 120 and the cellular transceiver 114. In the wireless communication subsystem 300, the cellular transceiver 114 and satellite receiver 120 are individually switched and capable of operating independently. Consequently, the satellite receiver 120 can use an external antenna 312 while the cellular transceiver 114 uses an internal antenna 310, or vice versa, the satellite receiver 120 and the cellular transceiver 114 can both use an external antennas 312, or the satellite receiver 120 and the cellular transceiver 114 can both use an internal antennas 30. The baseband processor 304, or main processor 104, selects either the internal antenna 310 or external antenna 312 for the satellite receiver 120 and the cellular transceiver 114 depending on factors such as signal quality and ancillary information from the sensors 130. Each of the wireless transceivers/receivers 306 (e.g., the satellite receiver 120 and the cellular transceiver 114) may also be separately powered-on, powered-off or placed into a sleep mode.

The terms "switch" and "switching" used in the described embodiments are not intended to be restricted to changing the active antenna. Instead, the terms are intended to include instructing a respective switch 308 to make a particular antenna the active antenna if the particular antenna is not already the active antenna. Switch 308 may comprise an electronic switch, solid state switch, or electro-mechanical (e.g., relay) depending on implementation. Switch 308 may be instructed to select various antennae by processor 104 or other circuitry, such as a communication subsystem.

While not shown, each of the wireless transceivers/receivers 306 has an RF front end circuit (also known as a transceiver module/receiver module) which generally includes all components between the antennas and the digital baseband processor 304. For example, the RF front end circuit of a cellular transceiver includes a receiver, a transmitter, and local oscillators (LOs). The receiver performs common receiver functions as signal amplification, frequency down conversion, filtering, channel selection, etc., as well as analog-to-digital conversion (ADC). The ADC of a received signal allows more complex communication functions such as demodulation and decoding to be performed by the digital baseband processor 304. In a similar manner, signals to be transmitted are processed, including modulation and encoding, for example, by the digital baseband processor 304. The processed signals are input to the transmitter for digital-to-analog conversion (DAC), frequency up conversion, filtering, amplification, and transmission via the antennas. A receiver, lacking transmitting functions, typically omits components required for receiving.

Figure 3B:
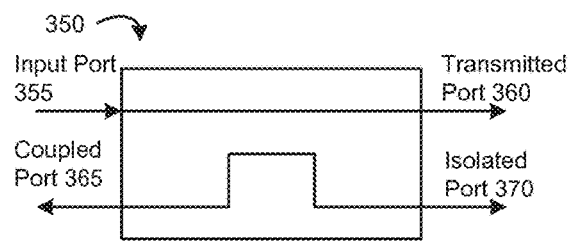
FIG. 3B is a schematic diagram of radio frequency (RF) coupler.

Each cellular transceiver 114 includes an RF directional coupler in at least some embodiments. The RF directional coupler is a RF passive device used to couple a specific proportion of the power travelling in one transmission line out through another connection or port. As shown in FIG. 3B, the RF directional coupler 350 is a four port device: an input port 355, a transmitted port 360, a coupled port 365, and an isolated port 370. The RF directional coupler typically uses capacitive coupling. However, any suitable construction may be used for the RF directional coupler. The RF directional coupler 1000 may be used to sample transmission signals from an antenna (e.g., an internal antenna 310 or external antenna 312, typically using the coupled port 365, to determine whether the antenna is transmitting during a transmission. If the antenna is not transmitting during a transmission, this is an indication that the antenna has an abnormal antenna condition, for example, that the antenna may be disconnected, damaged, or has malfunctioned. If the antenna is transmitting during a transmission, this is an indication of a normal antenna condition, i.e. that the antenna is operational and functioning normally and is not damaged.

Figure 5:
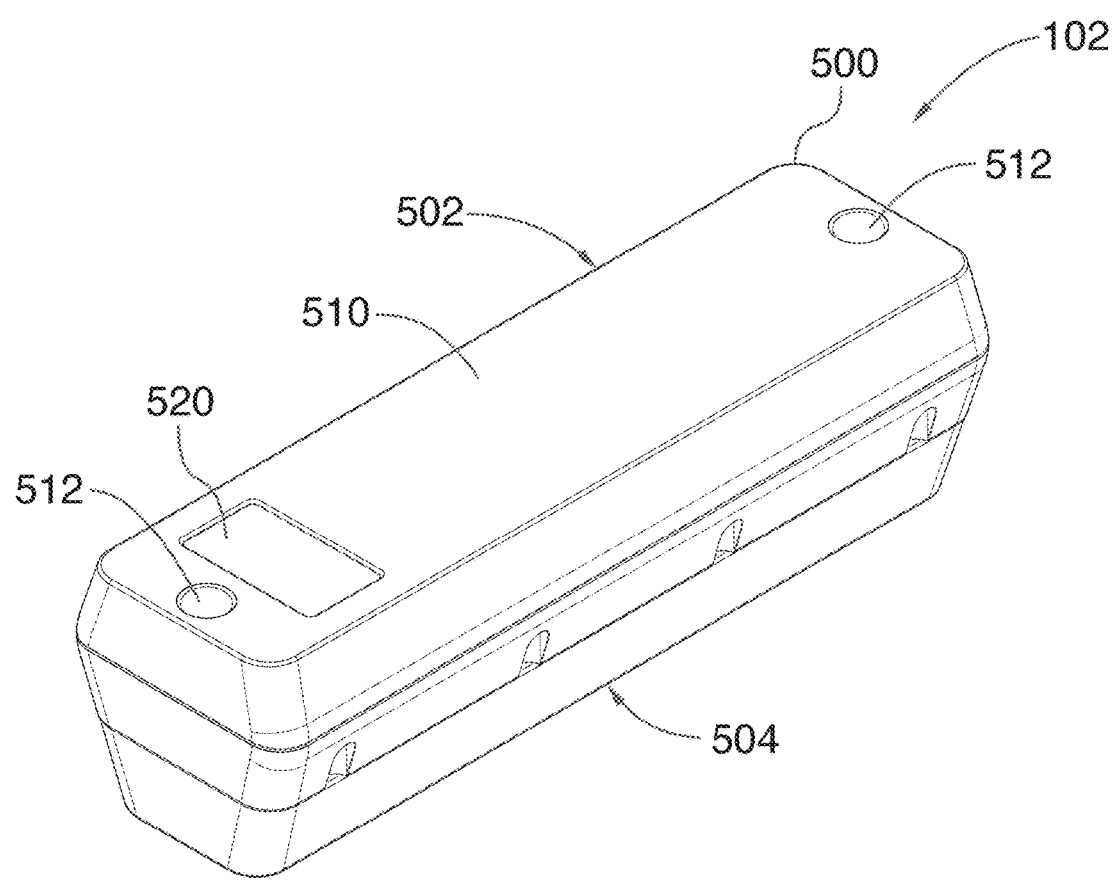
FIG. 5 is a perspective view of a mobile transceiver housing in accordance with one embodiment of the present disclosure.

FIG. 5 illustrates a mobile transceiver housing 500 of the mobile transceiver 102 in accordance with one example embodiment of the present disclosure. The housing 500 is a two-part, interconnected module, configured to be mounted to a shipping container, for example, through a door of the shipping container. The housing 500 comprises an internal module 502 and an external module 504. The internal module 502 is configured to be mounted on the interior of the shipping container, for example, on an inside surface of a door of the shipping container. The external module 504 is configured to be mounted on the exterior of the shipping container, for example, on an outside surface of the door of the shipping container. The external module carries the external antennas 312. The internal module carries the internal antennas 310, and most of the other electronic components of the mobile transceiver 102.

The internal module 502 and external module 504 are connected to each other, for example, by mounting screws (or bolts) when mounted to a shipping container 400 or other asset. A pair of mounting screws is used in the shown embodiment. A different number of mounting screws could be provided in other embodiments. In preparation for mounting the mobile transceiver 102, three holes are formed in the door of the shipping container using drilling or the like. Alternatively, the holes may be performed in the shipping container. Two of the holes are provided to receive the mounting screws while the third hole is used to pass through electronics from the internal module 502, such as external antennas for the cellular transceiver 114 and satellite receiver 120 and associated circuitry, to be carried in the external module 504 in the mounted mobile transceiver 102. In the shown embodiment, two holes 512 are formed in the front panel 510 of the internal module 502 for receiving the mounting screws. Corresponding holes are located in the bottom of the internal module 502. A hole in the bottom of the internal module 502 is also provided for receiving the electronics. The front panel 510 of the internal module 502 also includes a light transmissive panel 520, such as a transparent panel.

The housing 500 defines a sensor compartment for receiving at least some of the sensors 130 located opposite to the transmissive panel 520. The sensor compartment carries the light sensor 131 and the one or more ToF sensors 137. In the described embodiment, two ToF sensors 137 are carried in the sensor compartment. In some embodiments, one ToF sensor 137 may be configured for long-range sensing and the other ToF sensor 137 may be configured for short-range sensing. In some embodiments, the measuring range of the ToF sensors 137 may be configurable, for example, using software. In at least some embodiments, each ToF sensor 137 comprises an integrated circuit (IC), an light emitting diode (LED) emitter, and a LED received. The ToF sensors 137 may be mounted together with the light sensor 131 on a printed circuit board (PCB), such as a flexible PCB, carried in the sensor compartment.

The light sensor 131 is configured and positioned within the sensor compartment for sensing light outside of the mobile transceiver 102 through the transmissive panel 520. The first sensor 137 is configured and positioned within the sensor compartment for detecting objects in a first direction through the transmissive panel 520 outside of the mobile transceiver 102, i.e. within the interior of the shipping container when the mobile transceiver 102 is mounted to the shipping container. For example, the first ToF sensor 137 may be used for detecting objects within the interior of the shipping container by measuring the distance between the mobile transceiver 102 and the nearest object in the first direction, and determining whether the shipper container is loaded (e.g., one or more objects detected) or unloaded (e.g., no objects detected). The second ToF sensor 137 is configured and positioned within the sensor compartment for measuring the distance in a second direction between the second ToF sensor 137 and an inside surface of the front panel 510. The distance between the second ToF sensor 137 and an inside surface of the front panel 510 should be fixed. A change in the distance measured by the second ToF sensor 137, such as increase in the sensed distance, provides an indication of an abnormal antenna condition of the external antenna in that the external module 504 may be damaged or may have been tampered with. In the described embodiment, the ToF sensors 137 are configured to face opposite directions so that one sensor measures distance and the other sensor is used to detect the presence or absence of the external antenna module. Alternatively, in other embodiments the ToF sensors 137 may be configured to face the same direction and measure distance in different ranges, i.e., short range and long range, for increased accuracy. Alternatively, two ToF sensors 137 may be configured to face the same direction and measure distance in different ranges while one or more ToF sensors face the opposite direction to detect the presence or absence of the external antenna module.

Figure 4:
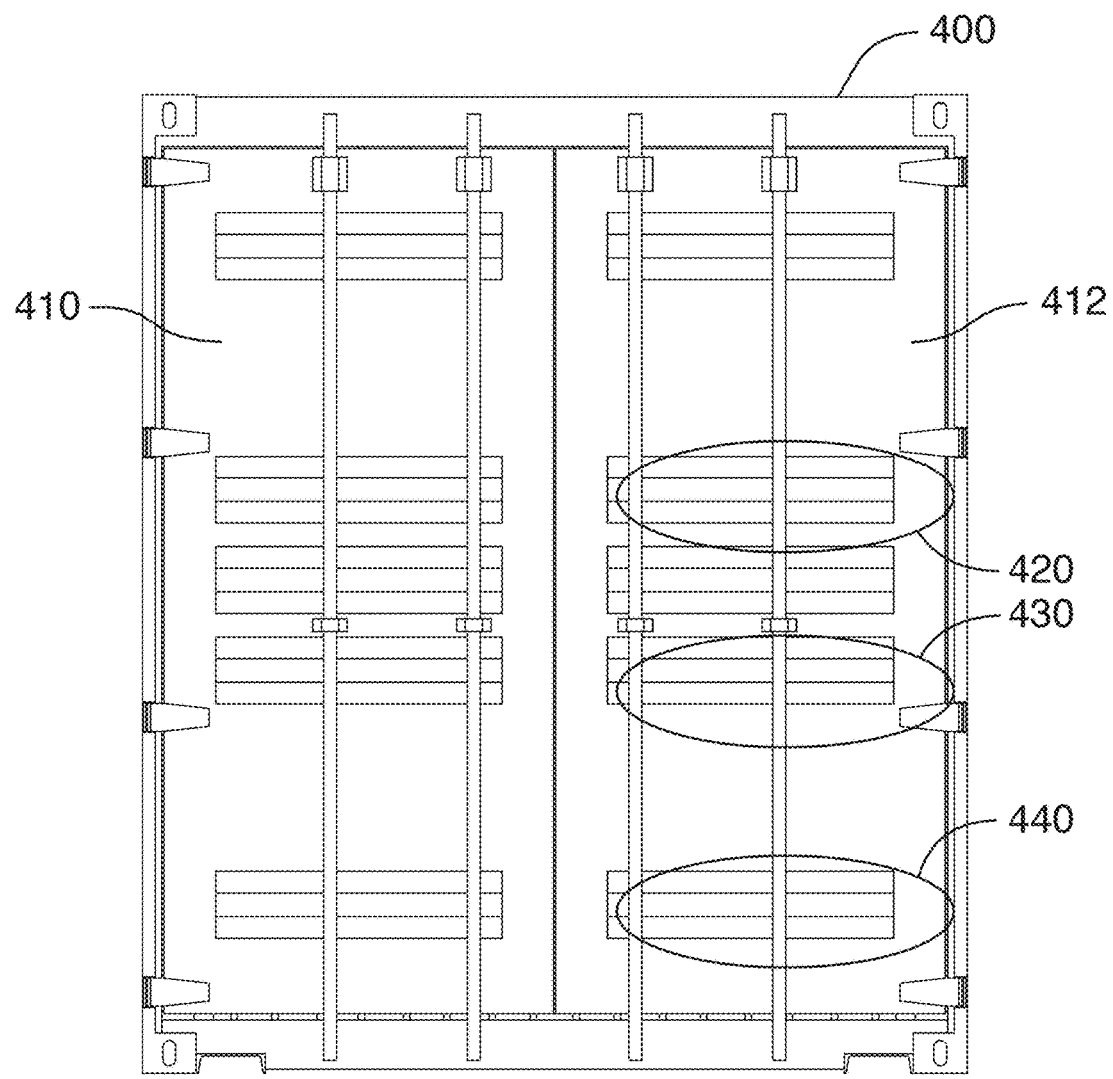
FIG. 4 is an example shipping container suitable for mounting a mobile transceiver in accordance with the present disclosure.

FIG. 4 illustrates an example shipping container 400 suitable for mounting the mobile transceiver 102. The shipping container 400 includes a pair of interlocking doors 410, 412. The mobile transceiver 102 is mounted through one of the doors 410, 412 with the internal module 502 on the inside of the door 410 or 412, and the external module 504 on the outside of the door 410 or 412. Suitable mounting locations for the mobile transceiver 102 on the door 412 are represented by references 420, 430 and 440. While example mounting locations for the mobile transceiver 102 are located on the door 412, it will be appreciated that the mobile transceiver 102 could be mounted on any door of the shipping container 400, or possibly a wall of the shipping container 400. Mounting screws 610 are received in the mounting holes 512 in the front panel 510 of internal module 502 of the mobile transceiver housing 500, and are secured in thread holes (not shown) on the inside of the external module 504 of the mobile transceiver housing 500. In some embodiments, the internal module 502 and external module 504 may be further secured to the container door 412 using a suitable mounting adhesive, such as a suitable double-sided adhesive strip or tape.

FIG. 6A to 6C illustrate the mobile transceiver 102 mounted to the door 412 of the shipping container 400. FIG. 6A is a front view of the mobile transceiver housing 500 mounted to the door 412 of the shipping container 400. FIG. 6B is a side view of the mobile transceiver housing 500 mounted to the door 412 of the shipping container 400. FIG. 6C is a sectional view of the mobile transceiver housing 500 mounted to a door of the shipping container 400. The sensor compartment for receiving the light sensor 131 and ToF sensors 137 is represented by reference 530, and is located opposite to the transmissive panel 520.

Figure 7A:
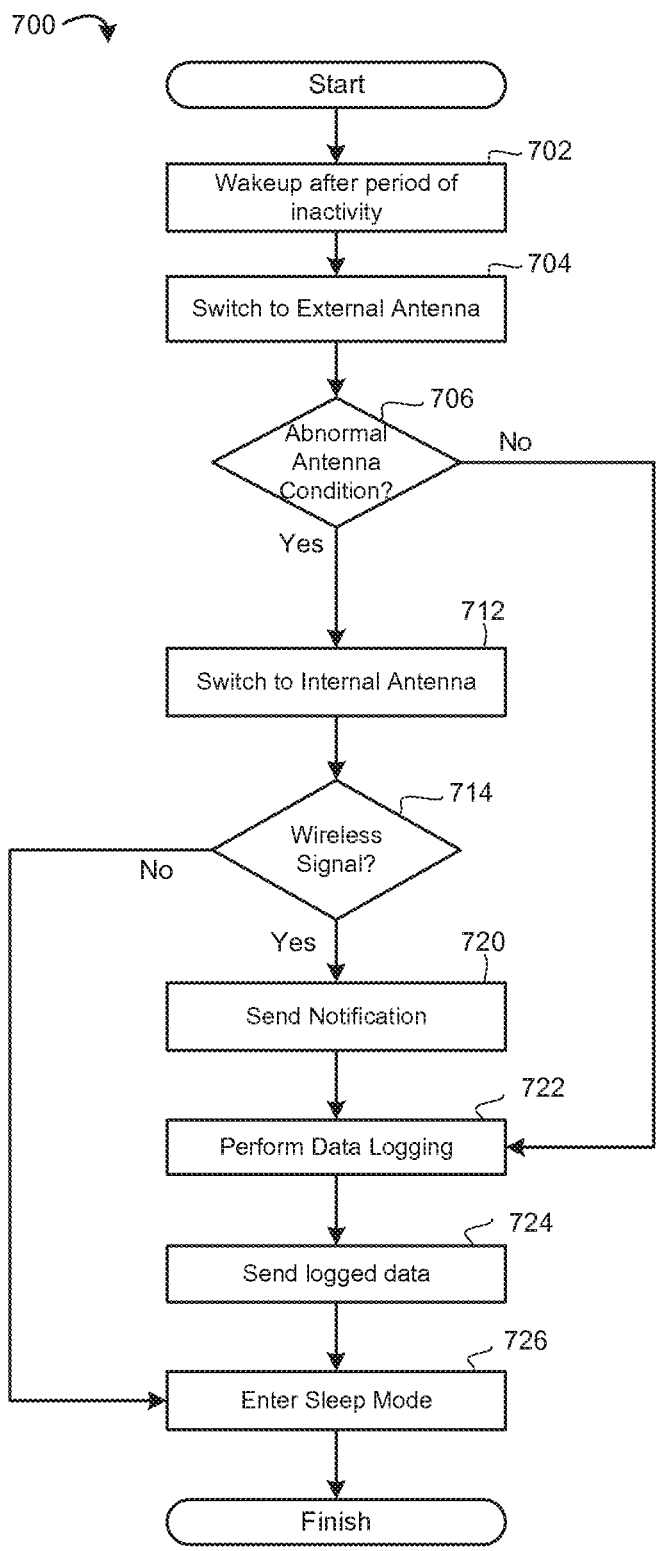
FIG. 7A to 7D are flowcharts illustrating example embodiments of a method of operating a mobile transceiver in accordance with example embodiments of the present disclosure.

FIG. 7A shows an example flowchart of a method 700 of operating a mobile transceiver 102 such as a GNSS tracking device in accordance with one example embodiment of the present disclosure. The method may be carried out by software executed by a processor of the mobile transceiver 102. Coding of software for carrying out such a method 700 is within the scope of a person of ordinary skill in the art provided the present disclosure. The method 700 may contain additional or fewer processes than shown and/or described, and may be performed in a different order in other embodiments. Machine readable code executable by the processor to perform the method 700 may be stored in a machine readable medium such as a memory of the mobile transceiver 102.

At 702, the mobile transceiver 102 wakes up after a period of inactivity. For example, the mobile transceiver 102 may wake up from a sleep mode in which one or more of the processor 104, cellular transceiver 114 or satellite receiver 120 was in a low power mode. The wakeup may be triggered by any number of normal or abnormal events. For example, the mobile transceiver 102 may wake up in accordance with a timer or scheduled wakeup event, or a trigger/alarm caused by measurements of one or more of the sensors 130. Waking up the cellular transceiver 114 and/or satellite receiver 120 may include activating the cellular transceiver 114 and/or satellite receiver 120 from a low power mode, which may be performed by the main processor 104 or the baseband processor 304, depending on the embodiment.

At 704, the mobile transceiver 102 switches to an external antenna 312 of a particular wireless transceiver, such as the cellular transceiver 114, and/or switches to an external antenna of a particular wireless receiver, such as the satellite receiver 120.

At 706, the mobile transceiver 102 determines whether an indication of an abnormal antenna condition of the external antenna 312 exists. An abnormal antenna condition of the external antenna 312 includes, without limitation, damage to the external antenna 312, tampering of the external antenna 312, malfunction of the external antenna 312, and disconnection of the external antenna 312. The indication is indicative but not determinative of the presence of an abnormal antenna condition of the external antenna 312. Several different approaches can be used to determine whether an indication of an abnormal antenna condition of the external antenna 312 exists, examples of which are described below. When the mobile transceiver 102 determines that an indication of an abnormal antenna condition of the external antenna 312 exists, at 712 the mobile transceiver 102 switches to an internal antenna 310 of the particular wireless transceiver or wireless receiver.

At 714, the mobile transceiver 102 determines whether a wireless signal for the cellular transceiver 114 is available. This operation may be performed regardless of which wireless transceiver or wireless receiver has been determined to have an external antenna 312 for which an indication of an abnormal antenna condition exists in 706. This operation comprises the cellular transceiver 114 searching for a wireless signal for a wireless service, and determining if any responses are received in response to the scanning.

When a wireless signal is available, processing proceeds to 720 at which the mobile transceiver 102 selects and accesses, or connects to, the wireless service, and sends a notification message (e.g., alarm or alert) to the asset tracking service 200. The notification message provides an indication that an abnormal antenna condition of the external antenna 312 for the particular wireless transceiver or wireless receiver exists.

At 722, the mobile transceiver 102 may optionally perform data logging. Data logging may comprise determining its location and/or sensing its environment using the sensors 130. When determining its location, the mobile transceiver 102 determines its location using the satellite receiver 120 and stores the determined location and a time associated with the determined location in the data log in the memory 112. When sensing its location, the mobile transceiver 102 optionally senses, via one or more of the sensors 130, an environment of the mobile transceiver 102. The sensor data obtained via the sensors 130 and a time at which the sensor data was obtained is stored in the data log stored in the memory 112.

At 724, the mobile transceiver 102 may optionally send at least a portion of the data log to the asset tracking service 200 using the wireless service. The mobile transceiver 102 may also optionally send, as part of the data log or separately, the last know position which may be the current position if the satellite receiver 120 is functional and/or able to provide the current position. Alternatively, the current position may be inferred from the cellular transceiver identifying the cellular tower or area (e.g., from a database of cellular towers) based on the mobile data connection to the cellular network 160.

At 726, after the mobile transceiver 102 has sent at least a portion of the data log to the asset tracking service 200 using the wireless service, a low power mode may be initiated for one or more of the processor 104, cellular transceiver 114 or satellite receiver 12.

Returning to decision block 706, when a wireless signal is not available, operations may proceed to 726 at which a low power mode may be initiated for one or more of the processor 104, cellular transceiver 114 or satellite receiver 12.

Figure 7B:
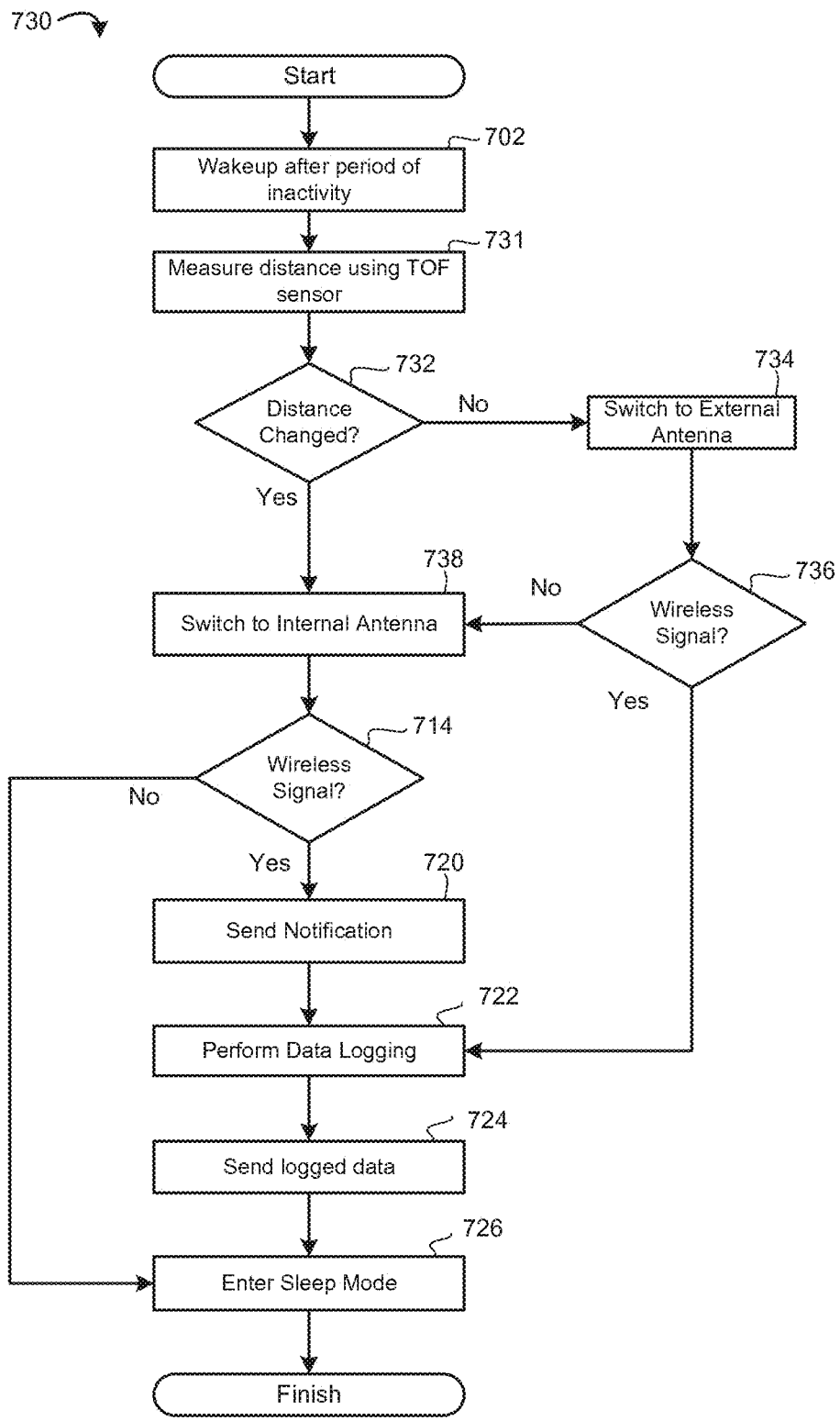

FIG. 7B shows an example flowchart of a method 730 of operating a mobile transceiver 102 such as a GNSS tracking device in accordance with one example embodiment of the present disclosure. The method 730 is similar to the method 700 described above. The method 730 uses a time-of-flight (ToF) sensor 137 (a distance sensor) to determine whether the distance to the external housing module 504 has changed.

At 731, after the mobile transceiver 102 wakes up after a period of inactivity, the mobile transceiver 102 activates a ToF sensor 137 positioned and configured to measure the distance between the ToF sensor 137 and the inside surface of the front panel 510 of the external housing module 504.

At 732, the mobile transceiver 102 determines whether the distance between the ToF sensor 137 and the inside surface of the front panel 510 has changed from a reference distance by more than a threshold amount. The reference distance may be a fixed distance or a previously measured distance. When the mobile transceiver 102 determines that the distance between the ToF sensor 137 and the inside surface of the front panel 510 has changed from the reference distance by more than the threshold amount, at 738 the mobile transceiver 102 switches to the internal antenna 310. A change in the distance between the ToF sensor 137 and the inside surface of the front panel 510 has changed from the reference distance by more than the threshold amount is an indication of damage to the external housing module 504 and/or external antenna 312 or tampering with the external housing module 504 and/or external antenna 312.

When the mobile transceiver 102 determines that the distance between the ToF sensor 137 and the inside surface of the front panel 510 has not changed from the reference distance by more than the threshold amount, at 738 the mobile transceiver 102 switches to the external antenna 312.

At 736, the mobile transceiver 102 optionally determines whether a wireless signal for the cellular transceiver 114 is available using the external antenna 312 and/or the signal strength of the external antenna 312. This operation comprises the cellular transceiver 114 searching for a wireless signal for a wireless service, and determining whether any responses are received in response to the scanning and/or measuring the signal strength of the external antenna 312 (e.g., received signal strength indicator (RSSI)).

When a wireless signal is available and/or the signal strength of the external antenna 312 exceeds a threshold, processing proceeds to 722 at which the mobile transceiver 102 may optionally perform data logging. When a wireless signal is not available and/or the signal strength of the external antenna 312 does not exceeds the threshold, processing proceeds to 738 at which the mobile transceiver 102 switches to the internal antenna 310.

Figure 7C:
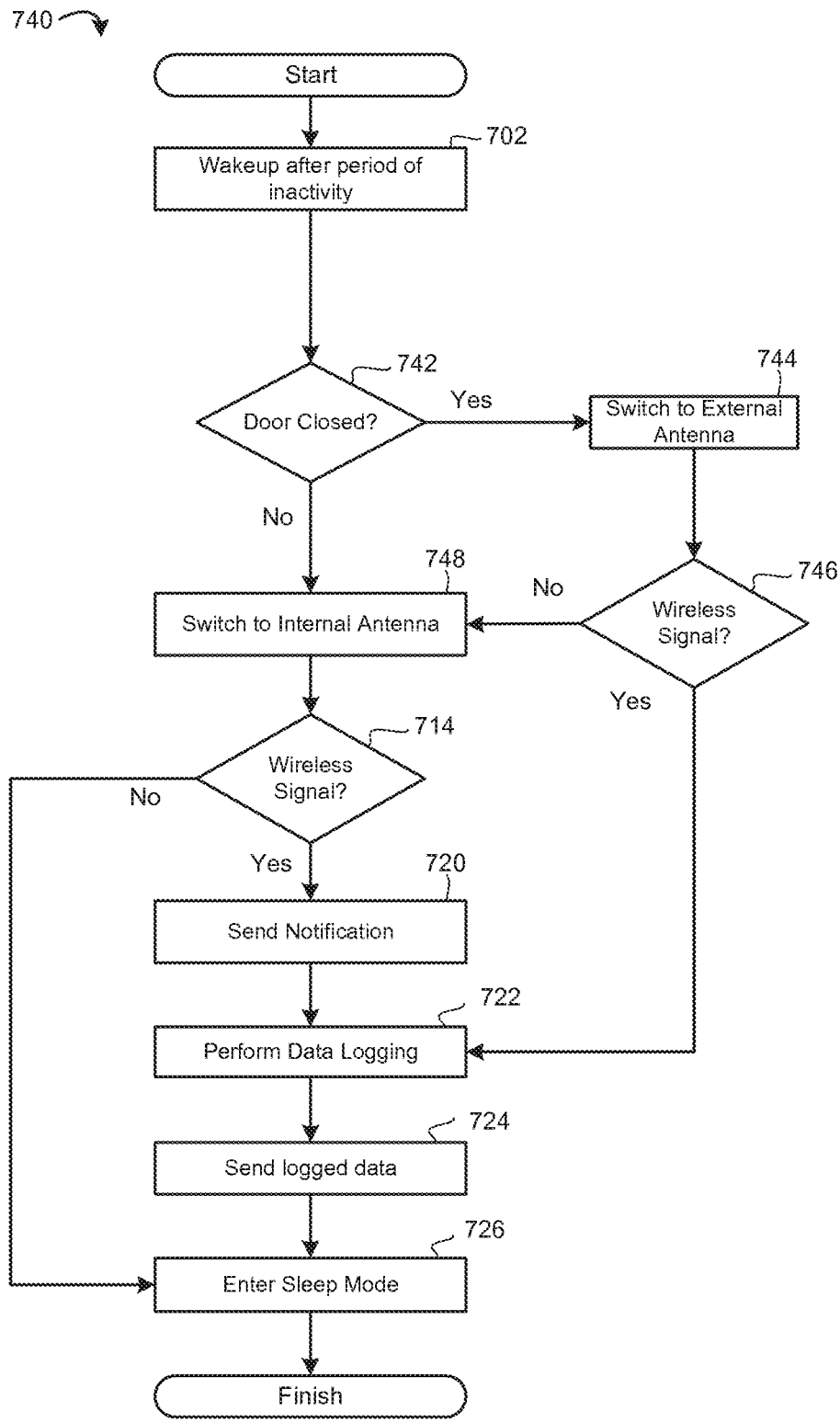

FIG. 7C shows an example flowchart of a method 740 of operating a mobile transceiver 102 such as a GNSS tracking device in accordance with one example embodiment of the present disclosure. The method 740 is similar to the methods 700 and 730 described above. The method 740 measures the signal strength of the internal antennas 310 and external antennas 312 in combination with other sensors 130 to determine whether the external housing module 504 and/or external antenna 312 has been damaged or tampered with, or whether damage or tampering with the external housing module 504 and/or external antenna 312 is suspected, and switch antennas if required.

At 742, the mobile transceiver 102 determines a state of the state of the shipping container door, namely whether the door of the shipping container 400 is open or closed using one or more of the sensors 130. This determination may be based on a door contact switch (not shown), ToF sensor 137 or other suitable sensor. When the mobile transceiver 102 determines that the door is open (not closed), at 748 the mobile transceiver 102 switches to the internal antenna 310.

When the mobile transceiver 102 determines that the door is closed, at 744 the mobile transceiver 102 switches to the external antenna 312. At 746, the mobile transceiver 102 optionally determines whether a wireless signal for the cellular transceiver 114 is available using the external antenna 312 and/or the signal strength of the external antenna 312. This operation comprises the cellular transceiver 114 searching for a wireless signal for a wireless service, and determining whether any responses are received in response to the scanning and/or measuring the measure the signal strength of the external antenna 312 (e.g., received signal strength indicator (RSSI)).

When a wireless signal is available and/or the signal strength of the external antenna 312 exceeds a threshold, processing proceeds to 722 at which the mobile transceiver 102 may optionally perform data logging. When a wireless signal is not available and/or the signal strength of the external antenna 312 does not exceeds the threshold, processing proceeds to 748 at which the mobile transceiver 102 switches to the internal antenna 310.

Figure 7D:
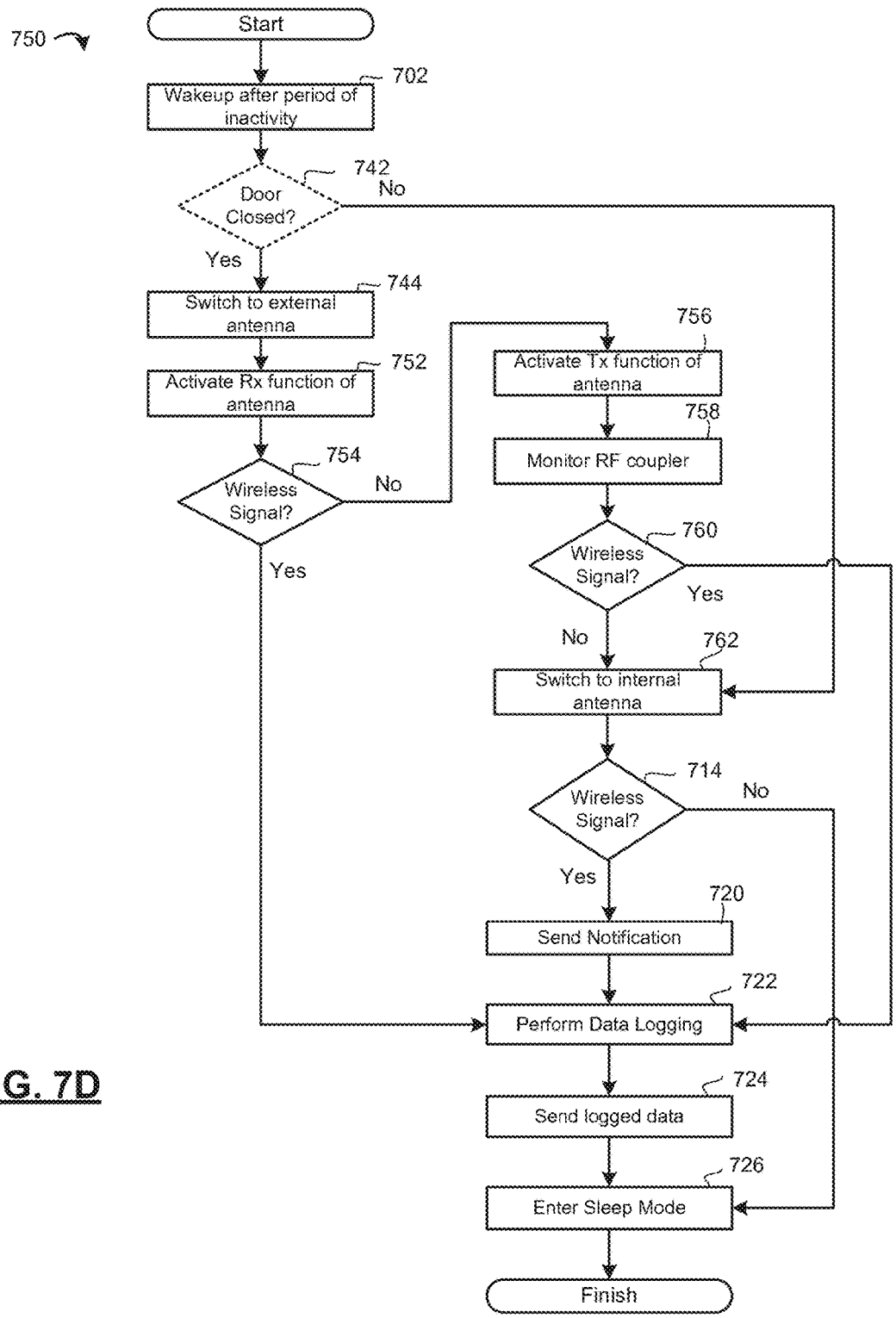

FIG. 7D shows an example flowchart of a method 750 of operating a mobile transceiver 102 such as a GNSS tracking device in accordance with one example embodiment of the present disclosure. The method 750 is similar to the method 740 described above, as well as the methods 700 and 730. The method 750 uses the RF coupler 350 in combination with other sensors 130 to determine whether the external housing module 504 and/or external antenna 312 has been damaged or tampered with, or whether damage or tampering with the external housing module 504 and/or external antenna 312 is suspected, and switch antennas if required. While the operation of determining whether the door of the shipping container 400 is open or closed is shown in FIG. 7D, this operation is optional and may be omitted in some embodiments.

At 752, after the mobile transceiver 102 switches to the external antenna 312, the mobile transceiver 102 activates or performs receiving functions (Rx) using the external antenna 312 and monitors received communications using the external antenna 312 for a threshold duration.

At 754, the mobile transceiver 102 determines whether a wireless signal was detected at any time during the performance of receiving functions. When a wireless signal was detected, processing proceeds to 722 at which the mobile transceiver 102 may optionally perform data logging. When a wireless signal was not present, processing proceeds to 756 at which the mobile transceiver 102 activates or performs transmitting functions (Tx) using the external antenna 312.

At 758, the mobile transceiver 102 monitors the RF coupler 350 which samples transmission signals from the external antenna 312 to determine whether the external antenna 312 is actually transmitting. If the external antenna 312 is not transmitting during transmitting functions, this is an indication that the external antenna 312 is damaged, disconnected or has malfunctioned. If the external antenna 312 is transmitting during transmitting functions, this is an indication of a normal antenna condition, i.e. that the external antenna 312 is operational and functioning normally and is not damaged.

At 760, the mobile transceiver 102 determines whether a wireless signal was detected at any time during the performance of transmitting functions. When a wireless signal was detected, processing proceeds to 722 at which the mobile transceiver 102 may optionally perform data logging. When a wireless signal was not present, processing proceeds to 762 at which the mobile transceiver 102 switches to the internal antenna 310.

Figure 8:
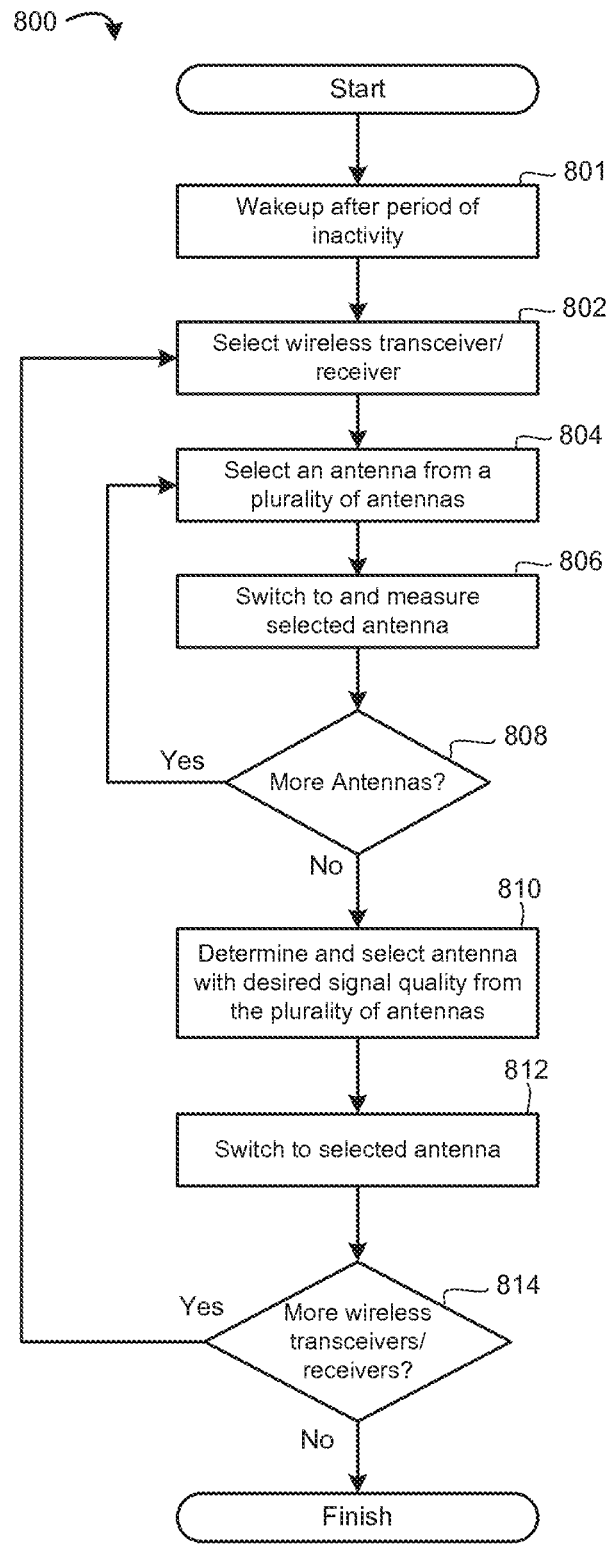
FIG. 8 is a flowchart illustrating an example embodiment of a method of selecting antennas in accordance with one embodiment of the present disclosure.

While the methods 700, 730, 740 and 750 have been described independently, the methods could be used at the same time. In addition, while the methods 700, 730, 740 and 750 have been described primarily in the context of a particular wireless transceiver, the methods can be applied to multiple wireless transceivers/receivers each having a multiple antenna configuration. FIG. 8 illustrates an example embodiment of a method 800 of selecting antennas in accordance with one embodiment of the present disclosure. The method may be carried out by software executed by a processor of the mobile transceiver 102. Coding of software for carrying out such a method 800 is within the scope of a person of ordinary skill in the art provided the present disclosure. The method 800 may contain additional or fewer processes than shown and/or described, and may be performed in a different order in other embodiments. Machine readable code executable by the processor to perform the method 800 may be stored in a machine readable medium such as a memory of the mobile transceiver 102.

At 801, the mobile transceiver 102 wakes up after a period of inactivity. At 802, the mobile transceiver 102 selects a wireless transceiver/receiver for evaluation (e.g., the cellular transceiver 114).

At 804, the mobile transceiver 102 selects an antenna for the selected wireless transceiver/receiver for evaluation. Typically, the wireless transceiver/receiver has an internal antenna 310 and an external antenna 312 with the external antenna 312 serving as the primary antenna and so is typically selected first. However, in some embodiments the external antenna 312 may not be the primary antenna. Similarly, in some embodiments of a wireless transceiver/receiver with a multiple antenna configuration, there may be no distinction between primary and second antennas or between internal and external antennas.

At 806, the mobile transceiver 102 switches to and measures the selected antenna. At 808, the mobile transceiver 102 determines whether other antennas of the wireless transceiver/receiver require evaluation. If other antennas of the wireless transceiver/receiver require evaluation, operations 804 and 806 are repeated until all of the antennas of the wireless transceiver/receiver are evaluated. If not, operations proceed to 810.

At 810, the mobile transceiver 102 determines and selects the antenna with desired signal quality from the plurality of antennas for the particular wireless transceiver/receiver.

At 812, the mobile transceiver 102 switches to the selected antenna.

At 814, the mobile transceiver 102 determines whether other wireless transceiver/receivers require evaluation. For example, if there is more than one cellular transceiver 114, each cellular transceiver 114 will be evaluated. Similarly, the satellite receiver 120 will be evaluated. If other wireless transceiver/receivers require evaluation, operations 802 and 812 are repeated until each wireless transceiver/receiver have been evaluated. If not, the operations end.

The present disclosure provides a method and mobile transceiver for asset tracking which detects an indication of an abnormal antenna condition of the external antenna 312 (e.g., detects damage or tampering, or suspected damage or tampering). The mobile transceiver of the present disclosure comprises a cellular transceiver and a satellite receiver, each having an internal antenna and external antenna. Advantageously, the present disclosure provides a solution for detecting an indication of an abnormal antenna condition of the external antenna, such as damage or tampering of the external antenna and/or external antenna housing or suspected damage or tampering, and switches operation from the primary external antennas to the secondary internal antennas when an indication of an abnormal antenna condition of the external antenna 312 exists (e.g., when the primary external antennas are not functional, or damage or tampering of the external antenna and/or external antenna housing is detected or suspected).

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The subject-matter of the disclosure may also relate, among others, to the following aspects:

1. A method of operating a mobile transceiver having a processor, a wireless transceiver, an internal antenna and an external antenna each coupled to the wireless transceiver via a switch, the method comprising:
  switching an active antenna for the wireless transceiver to the external antenna;
  determining whether an indication of an abnormal antenna condition of the external antenna has been detected; and
    when an indication of an abnormal antenna condition of the external antenna has been detected,
    switching the active antenna for the wireless transceiver from the external antenna to the internal antenna, and
    sending, by the wireless transceiver via the internal antenna, a notification to an asset tracking service that an indication of an abnormal antenna condition of the external antenna has detected.

2. The method of aspect 1, further comprising:
  when an indication of an abnormal antenna condition of the external antenna has been detected, sending, by the wireless transceiver via the internal antenna, at least a portion of the data log with a last known position to the asset tracking service.

3. The method of aspect 2, further comprising:
  when an indication of an abnormal antenna condition of the external antenna has not been detected, sending, by the wireless transceiver, at least a portion of the data log to an asset tracking service via the external antenna.

4. The method of aspect 1, wherein determining whether an indication of an abnormal antenna condition of the external antenna has been detected comprises:
  measuring a distance to an inside surface of a front panel of an external housing module which carries the external antenna; and
  detecting an indication of an abnormal antenna condition of the external antenna when the distance to the inside surface of the front panel has changed from a reference distance by more than a threshold amount.

5. The method of aspect 1, further comprising:
  determining whether a door of a container to which the mobile transceiver is mounted is open or closed;
  wherein switching to the external antenna is performed when the door of the container to which the mobile transceiver is mounted is determined to be closed;
  wherein switching to the internal antenna is performed when the door of the container to which the mobile transceiver is mounted is determined to be open.

6. The method of aspect 1, wherein determining whether an indication of an abnormal antenna condition of the external antenna has been detected comprises:
  determining, by the wireless transceiver via the external antenna, whether a wireless signal is available; and
  detecting an indication of an abnormal antenna condition of the external antenna when a wireless signal is not available.

7. The method of aspect 1, wherein determining whether an indication of an abnormal antenna condition of the external antenna has been detected comprises:
  determining, by the wireless transceiver via the external antenna, whether a signal strength measured with the external antenna exceeds a threshold; and
  detecting an indication of an abnormal antenna condition of the external antenna when the signal strength measured by the external antenna does not exceed the threshold.

8. The method of aspect 1, wherein determining whether an indication of an abnormal antenna condition of the external antenna has been detected comprises:
  performing receiving functions with the external antenna for a threshold duration;
  determining whether a wireless signal was detected during the performance of receiving functions;
  performing transmitting functions with the external antenna for a threshold duration when a wireless signal was detected during the performance of receiving functions;
  monitoring a radio frequency (RF) coupler during transmitting functions;
  determining whether a wireless signal was detected during the performance of transmitting functions; and
  detecting an indication of an abnormal antenna condition of the external antenna when a wireless signal was detected during the performance of transmitting functions.

9. The method of aspect 8, wherein an indication of an abnormal antenna condition of the external antenna is not detect when a wireless signal was detected during the performance of receiving functions.

10. The method of aspect 1, wherein determining whether an indication of an abnormal antenna condition of the external antenna has been detected comprises:
  determining whether a ground pin of the external antenna is coupled to the wireless transceiver;
  detecting an indication of an abnormal antenna condition of the external antenna when the ground pin of the external antenna is not determined to be coupled to the wireless transceiver.

11. The method of aspect 10, wherein determining whether a ground pin of the external antenna is coupled to the wireless transceiver comprises:
  determining whether the ground pin is coupled to a general-purpose input/output (GPIO) pin of a processor coupled to the wireless transceiver;
  detecting an indication of an abnormal antenna condition of the external antenna when the ground pin is not determined to be coupled to the GPIO pin of the processor coupled to the wireless transceiver.

12. The method of aspect 1, further comprising:
  prior to switching to the external antenna, activating the wireless transceiver from a low power mode; and
  initiating a low power mode for the wireless transceiver when a wireless service is not available.

13. The method of aspect 1, wherein the mobile transceiver further comprises a satellite receiver, a further internal antenna and a further external antenna each coupled to the satellite receiver via a further switch, the method comprising:
  switching an active antenna for the satellite receiver to the further external antenna;
  determining whether an indication of an abnormal antenna condition of the further external antenna has been detected; and
    when an indication of an abnormal antenna condition of the further external antenna has been detected, switching the active antenna for the satellite receiver from the further external antenna to the further internal antenna, and sending, by the wireless transceiver, a notification to an asset tracking service that an indication of an abnormal antenna condition of the further external antenna has detected.

14. The method of aspect 1, wherein performing data logging comprises:

determining, via the satellite receiver, a location of the mobile transceiver; and storing the location and a time associated with the location in the data log stored in a memory.

15. The method of aspect 1, wherein performing data logging including:

sensing, via one or more sensors, an environment of the mobile transceiver; and storing sensor data obtained via the sensors and a time at which the sensor data was obtained in the data log stored in a memory.

16. The method of aspect 1, wherein the mobile transceiver is a two-part, interconnected module, configured to be mounted to a shipping container, wherein the interconnected module comprises an internal module to be located on an interior of the shipping container and which carries the internal antenna, and an external module to be located on an exterior of the shipping container and which carries the external antenna.

17. A method of operating a mobile transceiver having a processor, a wireless transceiver, an internal antenna and an external antenna each coupled to the wireless transceiver via a switch, wherein the mobile transceiver is a two-part, interconnected module, configured to be mounted to a door of a shipping container, wherein the interconnected module comprises an internal module to be located on an interior of the door of the shipping container and which carries the internal antenna, and an external module to be located on an exterior of the door of the shipping container and which carries the external antenna, the method comprising:

waking up the mobile transceiver after a period of inactivity;

determining whether the door of the shipping container to which the mobile transceiver is mounted is open or closed;

switching to the external antenna as an active antenna when the door of the shipping container to which the mobile transceiver is mounted is determined to be closed; and switching to the internal antenna as the active antenna when the door of the shipping container to which the mobile transceiver is mounted is determined to be open.

18. The method of aspect 17, further comprising:

when the external antenna is the active antenna, determining, by the wireless transceiver via the external antenna, whether a wireless signal is available; and switching the active antenna from the external antenna to the internal antenna when a wireless signal is not available.

19. The method of aspect 18, further comprising:

when the internal antenna is the active antenna, determining, by the wireless transceiver via the internal antenna, whether a wireless signal is available; and initiating a low power mode for the wireless transceiver when a wireless service is not available.

20. A method of operating a mobile transceiver having a processor, a wireless transceiver, a plurality of antennas coupled to the wireless transceiver via a switch, the method comprising:

waking up the mobile transceiver after a period of inactivity;

measuring, via the wireless transceiver, a wireless signal using each of the plurality of antennas;

selecting an antenna in the plurality of antennas in accordance with the measured wireless signals; and switching to the selected antenna as an active antenna of the wireless transceiver.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver having a processor, a wireless transceiver, a first antenna and a second antenna each coupled to the wireless transceiver via a switch, the method comprising:

determining whether a door of a container to which the mobile transceiver is mounted is open or closed;

switching an active antenna for the wireless transceiver to the first antenna when the door of the container is determined to be open; and switching the active antenna for the wireless transceiver to the second antenna when the door of the container is determined to be closed.

2. The method of claim 1, wherein the first antenna is an internal antenna located on an interior of the container and the second antenna is an external antenna located on an exterior of the container.

3. The method of claim 2, wherein the mobile transceiver is a two-part, interconnected module, wherein the interconnected module comprises an internal module to be located on an interior side of the door of the container and which carries the internal antenna, and an external module to be located on an exterior side of the door of the container and which carries the external antenna.

4. The method of claim 2, further comprising:

when the external antenna is the active antenna, determining, by the wireless transceiver via the external antenna, whether a wireless signal is available; and switching the active antenna from the external antenna to the internal antenna when a wireless signal is not available.

5. The method of claim 4, further comprising:

when the internal antenna is the active antenna, determining, by the wireless transceiver via the internal antenna, whether a wireless signal is available; and initiating a low power mode for the wireless transceiver when a wireless service is not available.

6. The method of claim 1, further comprising:
prior to switching the active antenna, activating the wireless transceiver from a low power mode after a period of inactivity; and
initiating a low power mode for the wireless transceiver when a wireless service is not available.

7. The method of claim 1, wherein the mobile transceiver further comprises a satellite receiver, a third antenna and a fourth antenna each coupled to the satellite receiver via a further switch, the method further comprising:
switching the active antenna for the satellite receiver to the third antenna when the door of the container is determined to be open; and
switching the active antenna for the satellite receiver to the fourth antenna when the door of the container is determined to be closed.

8. The method of claim 7, wherein the third antenna is a further internal antenna located on an interior of the container and the fourth antenna is a further external antenna located on an exterior of the container.

9. The method of claim 8, wherein the mobile transceiver is a two-part, interconnected module, wherein the interconnected module comprises an internal module to be located on an interior side of the door of the container and which carries the further internal antenna, and an external module to be located on an exterior side of the door of the container and which carries the further external antenna.

10. The method of claim 1, further comprising performing data logging.

11. The method of claim 10, wherein performing data logging comprises:
determining, via a satellite receiver, a location of the mobile transceiver; and
storing the location and a time associated with the location in the data log stored in a memory.

12. The method of claim 10, wherein performing data logging comprises:
sensing, via one or more sensors, an environment of the mobile transceiver; and
storing sensor data obtained via the sensors and a time at which the sensor data was obtained in the data log stored in a memory.

13. The method of claim 10, further comprising:
sending, by the wireless transceiver, at least a portion of the data log with a last known position to an asset tracking service.

14. A mobile transceiver, comprising:
a processor;
a memory coupled to the processor, wherein the memory has stored thereon executable instruction;
a wireless transceiver coupled to the processor;
a first antenna and a second antenna each coupled to the wireless transceiver via a switch;
wherein the executable instructions, when executed by the processor, cause the mobile transceiver to:
determine whether a door of a container to which the mobile transceiver is mounted is open or closed;
switch an active antenna for the wireless transceiver to the first antenna when the door of the container is determined to be open; and
switch the active antenna for the wireless transceiver to the second antenna when the door of the container is determined to be closed.

15. The mobile transceiver of claim 14, wherein the first antenna is an internal antenna located on an interior of the container and the second antenna is an external antenna located on an exterior of the container.

16. The mobile transceiver of claim 15, wherein the mobile transceiver is a two-part, interconnected module, wherein the interconnected module comprises an internal module to be located on an interior side of the door of the container and which carries the internal antenna, and an external module to be located on an exterior side of the door of the container and which carries the external antenna.

17. The mobile transceiver of claim 15, further comprising:
when the external antenna is the active antenna,
determining, by the wireless transceiver via the external antenna, whether a wireless signal is available; and
switching the active antenna from the external antenna to the internal antenna when a wireless signal is not available.

18. The mobile transceiver of claim 17, further comprising:
when the internal antenna is the active antenna,
determining, by the wireless transceiver via the internal antenna, whether a wireless signal is available; and
initiating a low power mode for the wireless transceiver when a wireless service is not available.

19. The mobile transceiver of claim 14, wherein the mobile transceiver further comprises a satellite receiver, a third antenna and a fourth antenna each coupled to the satellite receiver via a further switch, the method further comprising:
switching the active antenna for the satellite receiver to the third antenna when the door of the container is determined to be open; and
switching the active antenna for the satellite receiver to the fourth antenna when the door of the container is determined to be closed.

20. A non-transitory machine readable medium having tangibly stored thereon executable instructions that, when executed by a processor of a mobile transceiver, the mobile transceiver comprising a memory, a wireless transceiver, a first antenna and a second antenna each coupled to the wireless transceiver via a switch, cause the mobile transceiver to:
determine whether a door of a container to which the mobile transceiver is mounted is open or closed;
switch an active antenna for the wireless transceiver to the first antenna when the door of the container is determined to be open; and
switch the active antenna for the wireless transceiver to the second antenna when the door of the container is determined to be closed.

* * * * *